(12) United States Patent
Okubo

(10) Patent No.: US 11,628,836 B2
(45) Date of Patent: Apr. 18, 2023

(54) VEHICLE EXTERIOR ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 147 days.

(21) Appl. No.: 17/060,308

(22) Filed: Oct. 1, 2020

(65) Prior Publication Data

US 2021/0101593 A1 Apr. 8, 2021

(30) Foreign Application Priority Data

Oct. 3, 2019 (JP) .............................. JP2019-182598
Aug. 19, 2020 (JP) .............................. JP2020-138736

(51) Int. Cl.
*B60W 30/10* (2006.01)
*B60W 30/14* (2006.01)
*B60W 40/10* (2012.01)

(52) U.S. Cl.
CPC .......... *B60W 30/10* (2013.01); *B60W 30/143* (2013.01); *B60W 40/10* (2013.01); *B60W 2420/403* (2013.01)

(58) Field of Classification Search
CPC .... B60W 30/10; B60W 30/143; B60W 40/10; B60W 2420/403; B60W 2050/0056; B60W 2554/802; B60W 2554/805; B60W 2554/806; B60W 30/16; B60W 30/165; B60W 2554/4042; B60W 2554/4043

USPC ............................................................ 701/23
See application file for complete search history.

(56) References Cited

U.S. PATENT DOCUMENTS

| | | | |
|---|---|---|---|
| 2015/0353081 A1* | 12/2015 | Kaminade ............. | B60W 30/08 701/1 |
| 2019/0092330 A1* | 3/2019 | Ide ......................... | G01S 13/867 |
| 2020/0066161 A1* | 2/2020 | Hasegawa ............ | B60W 30/045 |
| 2020/0317219 A1* | 10/2020 | Yoshida ................... | B62D 6/00 |
| 2022/0075067 A1* | 3/2022 | Dussan .................... | G01S 17/86 |

FOREIGN PATENT DOCUMENTS

JP 3349060 B2 11/2002

\* cited by examiner

*Primary Examiner* — Scott A Reinbold
(74) *Attorney, Agent, or Firm* — McDermott Will & Emery LLP

(57) ABSTRACT

A vehicle exterior environment recognition apparatus includes a travel path derivation unit, a speed derivation unit, and a follow-up controller. The travel path derivation unit estimates an own-vehicle travel path and derives a target-vehicle travel path that contains a point on a target vehicle and forms a parallel curve to the own-vehicle travel path. The speed derivation unit derives a target-vehicle speed vector. The follow-up controller makes a follow-up control based on the target-vehicle speed vector on the condition that an angle formed by the target-vehicle speed vector and a tangential line to the target-vehicle travel path at the point on the target vehicle falls within a predetermined angular range, and makes the follow-up control based on a tangential speed component of the target-vehicle speed vector on the condition that the angle falls out of the angular range.

4 Claims, 6 Drawing Sheets

VEHICLE EXTERIOR ENVIRONMENT RECOGNITION APPARATUS

CROSS-REFERENCE TO RELATED APPLICATIONS

This application claims priority from Japanese Patent Application Nos. 2019-182598 filed on Oct. 3, 2019 and 2020-138736 filed on Aug. 19, 2020, the entire contents of which are hereby incorporated by reference.

BACKGROUND

The disclosure relates to a vehicle exterior environment recognition apparatus that makes a follow-up control after a target vehicle present in a traveling direction of an own vehicle.

Existing adaptive cruise control (ACC) techniques include detecting three-dimensional objects, e.g., vehicles, ahead of an own vehicle and making a control to avoid a collision with a preceding vehicle or to keep an appropriate distance to the preceding vehicle. For example, reference is made to Japanese Patent No. 3349060.

SUMMARY

An aspect of the technology provides a vehicle exterior environment recognition apparatus including a travel path derivation unit, a speed derivation unit, and a follow-up controller. The travel path derivation unit is configured to estimate an own-vehicle travel path to be traveled by an own vehicle, and derive a target-vehicle travel path. The target-vehicle travel path contains a point on a target vehicle as a target of a follow-up control and forms a parallel curve to the own-vehicle travel path. The speed derivation unit is configured to derive a target-vehicle speed vector as a speed vector of the target vehicle. The follow-up controller is configured to make the follow-up control on the basis of the target-vehicle speed vector on the condition that an angle formed by the target-vehicle speed vector and a tangential line to the target-vehicle travel path at the point on the target vehicle falls within a predetermined angular range. The follow-up controller is configured to make the follow-up control on the basis of a tangential speed component of the target-vehicle speed vector along the tangential line on the condition that the angle falls out of the predetermined angular range.

An aspect of the technology provides a vehicle exterior environment recognition apparatus including circuitry. The circuitry is configured to estimate an own-vehicle travel path to be traveled by an own vehicle, and derive a target-vehicle travel path. The target-vehicle travel path contains a point on a target vehicle as a target of a follow-up control and forms a parallel curve to the own-vehicle travel path. The circuitry is configured to derive a target-vehicle speed vector as a speed vector of the target vehicle. The circuitry is configured to make the follow-up control on the basis of the target-vehicle speed vector on the condition that an angle formed by the target-vehicle speed vector and a tangential line to the target-vehicle travel path at the point on the target vehicle falls within a predetermined angular range. The circuitry is configured to make the follow-up control on the basis of a tangential speed component of the target-vehicle speed vector along the tangential line on the condition that the angle falls out of the predetermined angular range.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
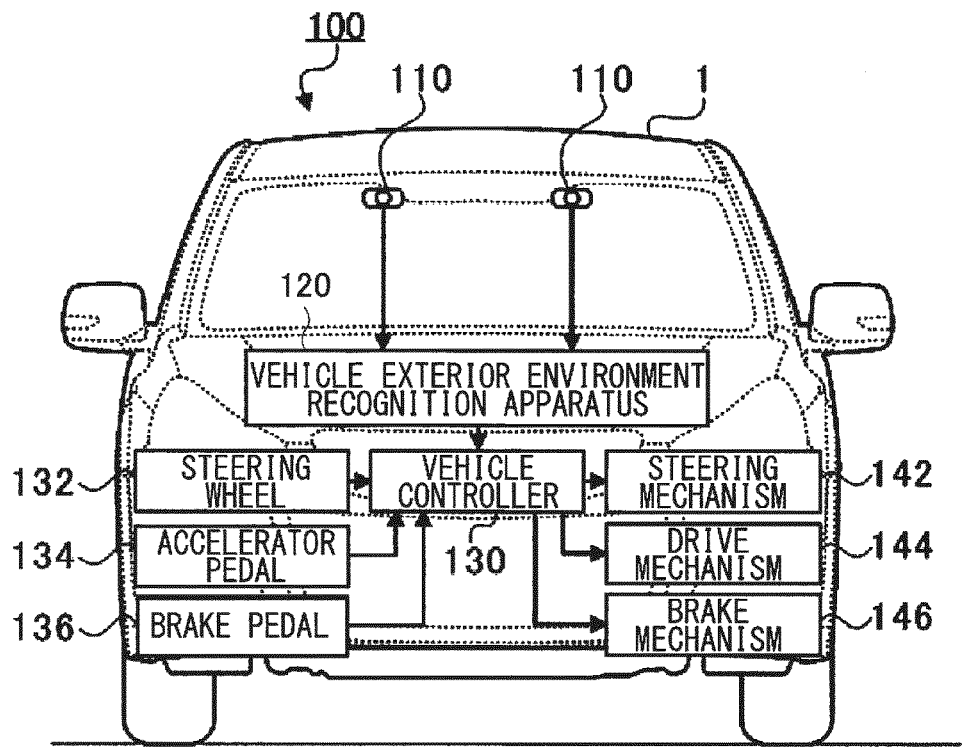
FIG. 1 is a block diagram illustrating a relation of connection in a vehicle exterior environment recognition system.

Some vehicles execute a follow-up control, as a kind of an adaptive cruise control (ACC). The follow-up control includes, in a case with presence of a preceding vehicle on a travel path of an own vehicle, allowing the own vehicle to follow the preceding vehicle to maintain a constant distance from the own vehicle to the preceding vehicle.

In such a follow-up control, the own vehicle derives a speed component in a travel direction of the own vehicle with respect to the preceding vehicle as a target of the follow-up control (hereinafter, also referred to as a target vehicle). On the basis of the speed component, the own vehicle maintains the constant distance between the vehicles. For example, even in a case where some vehicle cuts in ahead of the own vehicle, the speed component in the traveling direction of the own vehicle with respect to the vehicle cutting in becomes sufficiently low depending on an angle at which the vehicle cuts in. This makes it possible for the own vehicle to take an appropriate countermeasure by, for example, reducing its speed to a relatively low speed.

However, uniformly executing such a control causes the speed component to lower unintentionally even in a case where the preceding vehicle as the target of the follow-up control makes a turn far away. This also causes the speed of the own vehicle to lower rapidly. Such a change in the speed of the own vehicle may sometimes give the sense of incongruity to a driver.

In the future, the follow-up control will involve using a camera having a large angle of view or high resolution. This will make it possible to precisely derive the speed component lowering by, for example, the turn of the preceding vehicle, causing possibility of remarkable changes in the speed of the own vehicle.

It is desirable to provide a vehicle exterior environment recognition apparatus that makes it possible to provide an appropriate follow-up control.

In the following, some preferred but non-limiting embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

(Vehicle Exterior Environment Recognition System 100)

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller 130. The embodiment may include an example with the two image-capturing units 110 without limitation.

The image-capturing units 110 may each include an imaging device such as, but not limited to, a charge-coupled device (CCD) and a complementary metal-oxide semiconductor (CMOS). The image-capturing units 110 may each capture an image of vehicle exterior environment ahead of an own vehicle 1, and generate a luminance image. The luminance image may include at least luminance information, and be provided in the form of a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may include a capture of a three-dimensional object present in a detection region ahead of the own vehicle 1. Here, the three-dimensional object to be captured in the luminance image refers to an object that is present independently, as well as an object identifiable as a part of the independently present object. Non-limiting examples of the independently present three-dimensional object may include a vehicle, a bicycle, a pedestrian, a traffic light, a road sign, a guardrail, and a building. Non-limiting examples of the object identifiable as a part of the independently present object may include lamps of the vehicle and wheels of the bicycle.

The vehicle exterior environment recognition apparatus 120 may acquire the luminance image from each of the two image-capturing units 110, to derive parallax information with the use of so-called pattern matching. The parallax information may include parallax and an image position. The image position indicates where any block is positioned in an image. Here, a block is represented by, for example, an array of 4 pixels horizontally by 4 pixels vertically. The term horizontally refers to a transverse direction in an image captured. The term vertically refers to a longitudinal direction in the image captured. The pattern matching is a technique of searching one of the luminance images for a block corresponding to a block extracted from the other of the luminance images.

The pattern matching has a mathematical function that evaluates a degree of coincidence between the blocks. Non-limiting examples of such a mathematical function may include techniques such as, but not limited to, SAD (Sum of Absolute Difference), SSD (Sum of Squared intensity Difference), and NCC (Normalized Cross Correlation). The SAD includes obtaining a difference in the luminance. The SSD includes using the difference squared. The NCC includes obtaining a degree of similarity of a variance obtained by subtracting an average from luminance of each pixel. The vehicle exterior environment recognition apparatus 120 may perform such parallax derivation processing in units of blocks with respect to all blocks displayed in the detection region of, for example, 600 pixels by 200 pixels. Here, each block is assumed to include 4 pixels by 4 pixels, but the number of pixels in each block may be set at any value.

The vehicle exterior environment recognition apparatus 120 is configured to derive the parallax with respect to each block as a unit of resolution of detection, but is not configured to recognize what three-dimensional object the relevant block is a part of. It follows, therefore, that the parallax information is derived not in units of three-dimensional objects but in units of the resolution of detection. For example, the parallax information is derived independently in units of blocks in the detection region. Here, an image to which the parallax information thus derived is correlated is referred to as a distance image, separately from the luminance image described above.

Figure 2:
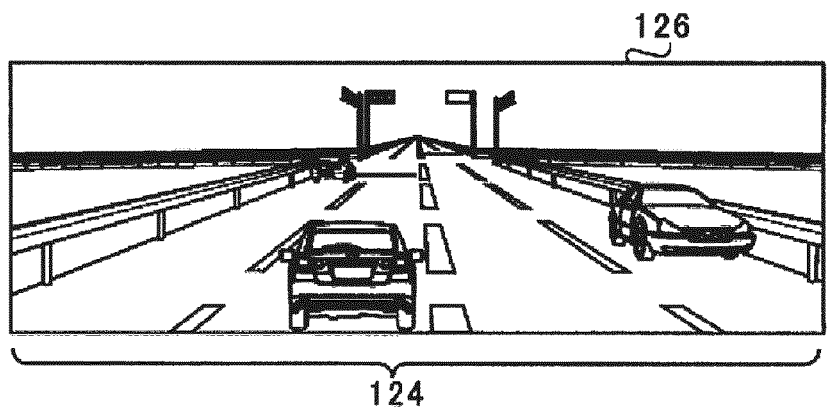
FIG. 2 describes an example of a luminance image.
Figure 3:
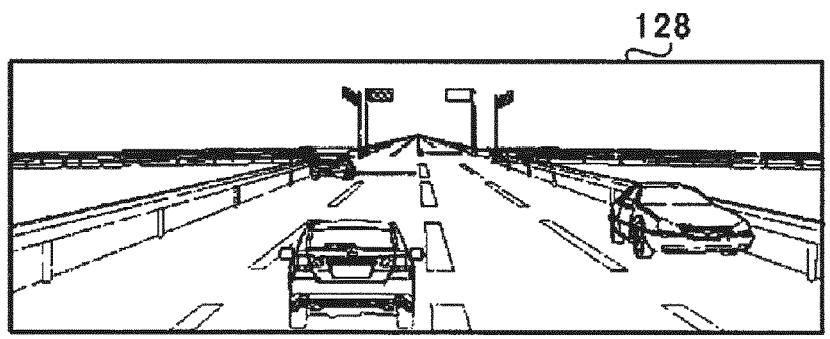
FIG. 3 describes an example of a distance image.

FIG. 2 illustrates a luminance image 126. FIG. 3 illustrates a distance image 128. For example, let us assume that the luminance images 126 as illustrated in FIG. 2 are generated with respect to a detection region 124 through the two image-capturing units 110. Note that FIG. 2 schematically illustrates one of the two luminance images 126 for easier understanding. The vehicle exterior environment recognition apparatus 120 obtains the parallax in units of blocks from the luminance image 126, to form the distance image 128 as illustrated in FIG. 3. With each block in the distance image 128, the parallax information regarding the relevant block is associated. In FIG. 3, for purposes of description, the block with respect to which the parallax is derived is represented by a black dot.

The vehicle exterior environment recognition apparatus 120 may, first, identify a road surface with the use of a luminance value, or a color value, based on the luminance image 126 and with the use of positional information in three-dimensional space in real space. The positional information may include a relative distance to the own vehicle 1 and be calculated on the basis of the distance image 128. Thereafter, the vehicle exterior environment recognition apparatus 120 may group, as a three-dimensional object, blocks that are positioned on the road surface identified, have equal color values, and have the positional information indicating that the blocks are close to one another in the three-dimensional space. Thus, the vehicle exterior environment recognition apparatus 120 may identify what kind of target object, e.g., a preceding vehicle or a bicycle, the three-dimensional object in the detection region ahead of the own vehicle 1 corresponds to.

Identifying the three-dimensional object in this way, the vehicle exterior environment recognition apparatus 120 may control the own vehicle 1 to avoid a collision with the three-dimensional object and maintain a safe distance to a preceding vehicle. Here, a follow-up control includes, in a case with presence of a preceding vehicle on a travel path of the own-vehicle 1, assisting a driver with an acceleration operation or a brake operation and allowing the own vehicle 1 to follow the preceding vehicle to maintain the constant distance from the own vehicle 1 to the preceding vehicle.

It is to be noted that the relative distance as mentioned above may be obtained by converting the parallax information in units of blocks in the distance image 128 into the three-dimensional positional information with the use of a so-called stereo method. Here, the stereo method is a method of deriving, from the parallax of a three-dimensional object, a relative distance to the image-capturing units 110 of the relevant three-dimensional object with the use of triangulation.

The vehicle controller 130 may include an ECU (Electronic Control Unit). The vehicle controller 130 may receive an input of the driver's operation through a steering wheel 132, an accelerator pedal 134, and a brake pedal 136, and transmit the input to a steering mechanism 142, a drive mechanism 144, and a brake mechanism 146, to control the own vehicle 1. The vehicle controller 130 may control the steering mechanism 142, the drive mechanism 144, and the brake mechanism 146 in accordance with an instruction from the vehicle exterior environment recognition apparatus 120.

As described above, the vehicle exterior environment recognition apparatus 120 may group, as a three-dimensional object, the blocks that have equal color values, and have the positional information indicating that the blocks are close to one another in the three-dimensional space. For example, let us assume a case with presence of a preceding vehicle ahead of the own vehicle 1. In this case, a plurality of blocks corresponding to a back surface of the preceding vehicle may be grouped as a three-dimensional object, considering their relative distances to the own vehicle 1 are equal. Thus, a determination may be made, in accordance with features of the three-dimensional object thus grouped, that the three-dimensional object is a preceding vehicle.

The vehicle exterior environment recognition apparatus 120 may assume all preceding vehicles present ahead of the own vehicle 1 to be candidate vehicles. In a case where some of the candidate vehicles are present on an own-vehicle travel path to be traveled by the own vehicle 1, the vehicle exterior environment recognition apparatus 120 may assume whichever candidate vehicle has the shortest relative distance to be the target vehicle. The vehicle exterior environment recognition apparatus 120 may execute the follow-up control on the basis of the relative distance to or a relative speed of whichever candidate vehicle has the shortest relative distance. Here, the own-vehicle travel path refers to a travel path having a width equal to or greater than a width of the own vehicle 1. Non-limiting examples of the own-vehicle travel path may include a lane currently traveled by the own vehicle 1 or predictably to be traveled later by the own vehicle 1. For example, the vehicle exterior environment recognition apparatus 120 may derive a speed component Vz in the traveling direction of the own vehicle 1 with respect to the target vehicle, and make a control to maintain the constant distance between the vehicles on the basis of the speed component Vz. For example, even in a case where some vehicle cuts in ahead of the own vehicle 1, the speed component Vz in the traveling direction of the own vehicle 1 with respect to the vehicle cutting in becomes sufficiently low depending on an angle at which the vehicle cuts in. This makes it possible for the own vehicle 1 to take an appropriate countermeasure by, for example, reducing its speed to a relatively low speed.

However, uniformly executing such a control with respect to a candidate vehicle cutting in and the continuously preceding target vehicle may cause the target vehicle making a turn far away to be determined as being a candidate vehicle cutting in. This causes the speed component Vz to lower unintentionally, causing the speed of the own vehicle 1 to lower rapidly. Such a change in the speed of the own vehicle 1 may sometimes give the sense of incongruity to the driver. It is desirable, in the embodiment, to accurately determine the speed of the target vehicle to provide an appropriate follow-up control.

Described in detail below is a configuration of the vehicle exterior environment recognition apparatus 120 according to the embodiment. In the embodiment, description concentrates on distinctive details of selecting what kind of speed to apply as the speed of the target vehicle.

(Vehicle Exterior Environment Recognition Apparatus 120)

Figure 4:
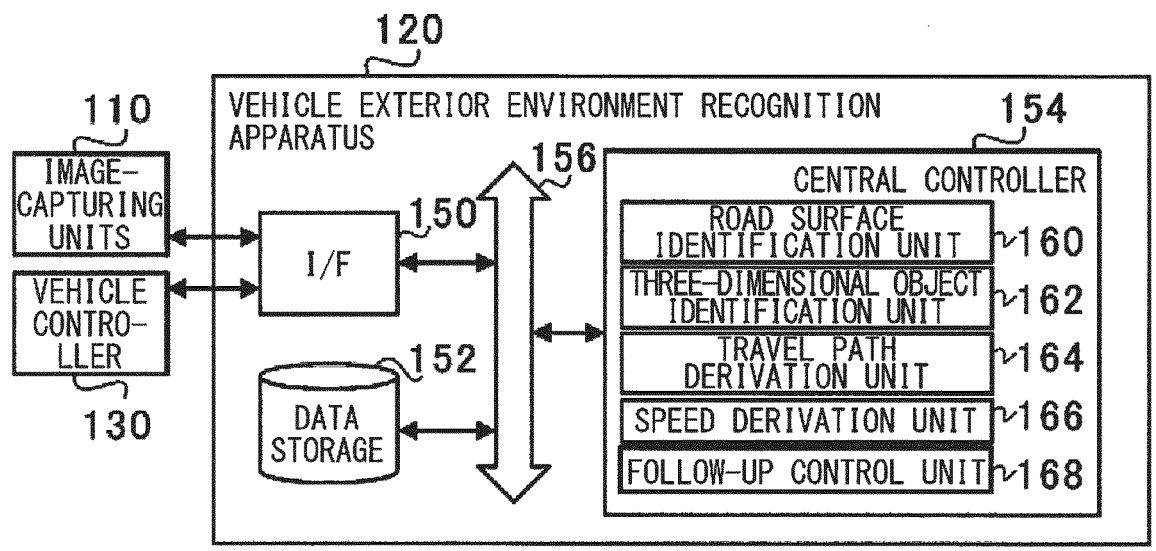
FIG. 4 is a block diagram illustrating, in outline, subunits of a vehicle exterior environment recognition apparatus.

FIG. 4 is a block diagram illustrating, in outline, subunits of the vehicle exterior environment recognition apparatus 120. As illustrated in FIG. 4, the vehicle exterior environment recognition apparatus 120 may include an I/F 150, a data storage 152, and a central controller 154.

The I/F 150 is an interface that carries out bi-directional information exchange with the image-capturing units 110 and the vehicle controller 130. The data storage 152 may include, for example, a RAM (Random Access Memory), a flash memory, and an HDD (Hard Disk Drive), and hold various pieces of information involved in processing by the subunits described below.

The central controller 154 may include a semiconductor integrated circuit including, for example, a CPU (Central Processing Unit), a ROM (Read Only Memory), and a RAM. The ROM may hold, for example, programs. The RAM may serve as a work area. The central controller 154 may control, for example, the I/F 150 and the data storage 152 through a system bus 156. In the embodiment, the central controller 154 may include a road surface identification unit 160, a three-dimensional object identification unit 162, a travel path derivation unit 164, a speed derivation unit 166, and a follow-up control unit 168. In the following, vehicle exterior environment recognition processing is described in detail, together with operation of the subunits of the central controller 154.

(Vehicle Exterior Environment Recognition Processing)

Figure 5:
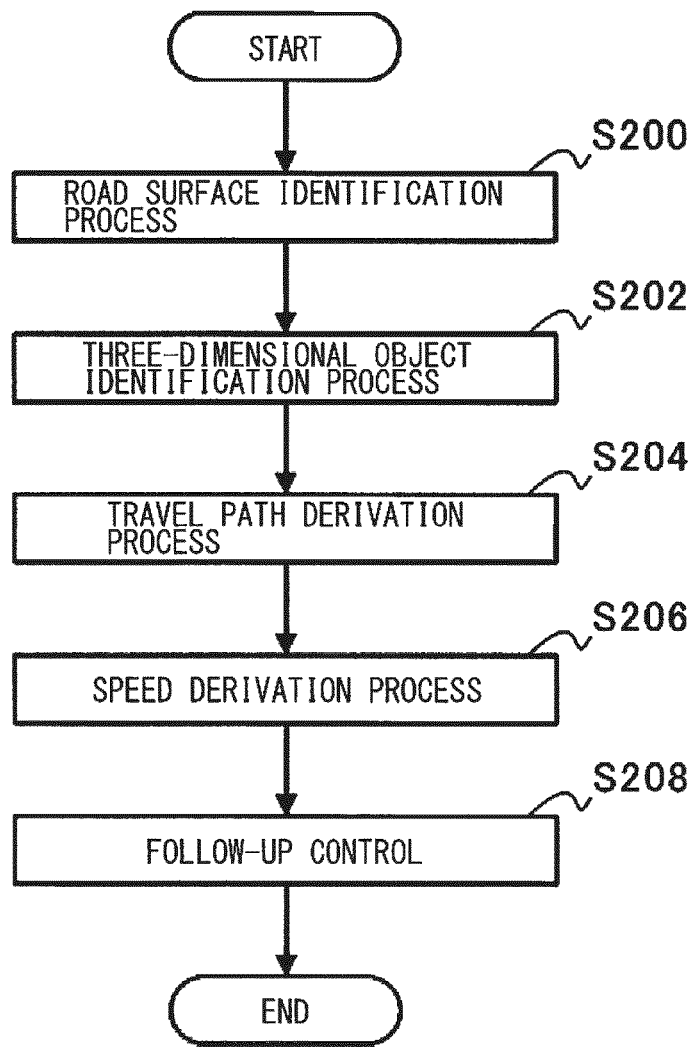
FIG. 5 is a flowchart illustrating a flow of vehicle exterior environment recognition processing.

FIG. 5 is a flowchart illustrating a flow of the vehicle exterior environment recognition processing. In the vehicle exterior environment recognition processing, by the road surface identification unit 160, the road surface ahead of the own vehicle 1 may be identified (S200). Thereafter, by the three-dimensional object identification unit 162, the candidate vehicle may be identified (S202). Thereafter, by the travel path derivation unit 164, the own-vehicle travel path and a target-vehicle travel path may be derived (S204). The target-vehicle travel path contains a point on the target vehicle as a target of the follow-up control and forms a parallel curve to the own-vehicle travel path. Thereafter, by the speed derivation unit 166, a target-vehicle speed vector may be derived (S206). The target-vehicle speed vector is a speed vector of the target vehicle. Thereafter, by the follow-up control unit 168, the follow-up control may be made in accordance with an angle formed by the target-vehicle speed vector and a tangential line to the target-vehicle travel path at the point on the target vehicle (S208).

(Road Surface Identification Process S200)

The road surface identification unit 160 may identify the road surface ahead of the own vehicle 1 on the basis of the luminance image 126 and the distance image 128. The road surface identification unit 160 may identify the road surface ahead of the own vehicle 1 on the basis of lane lines located on left and right sides of a lane traveled by the own vehicle 1. The lane lines may be, for example, white lines or any other colored lines. In an alternative, the road surface identification unit 160 may identify the road surface ahead of the own vehicle 1 on the basis of not only the lane lines on the left and right sides of the lane but also three-dimensional objects such as road markings, walls, steps along road shoulders, poles, and barriers.

(Three-Dimensional Object Identification Process S202)

The three-dimensional object identification unit 162 may identify a three-dimensional object having a height vertically upward from the road surface identified by the road surface identification unit 160. In one example, the three-dimensional object identification unit 162 may determine that a block located within a heightwise range of a plus or minus (±) predetermined distance (e.g. 0.3 meter) from the road surface is not a three-dimensional object. The three-dimensional object identification unit 162 may determine that a block located in a heightwise range of the predetermined distance or greater from the road surface is a candidate of a three-dimensional object protruding heightwise from the road surface.

The three-dimensional object identification unit 162 may group blocks having the equal relative distance to the own vehicle 1, out of a plurality of blocks as the candidate of the three-dimensional object having the height vertically upward from the road surface. Thus, the three-dimensional object identification unit 162 may identify the blocks thus grouped, as the three-dimensional object. Thereafter, the three-dimensional object identification unit 162 may determine whether or not the three-dimensional object is a candidate vehicle, or a preceding vehicle, on the basis of three-dimensional-object likeliness, e.g., a shape and a size, of a group of dots assumed to be the three-dimensional object. It is to be noted that for a determination as to whether or not the three-dimensional object is a vehicle, various existing techniques are available, and detailed description thereof is omitted.

(Travel Path Derivation Process S204)

Figure 6:
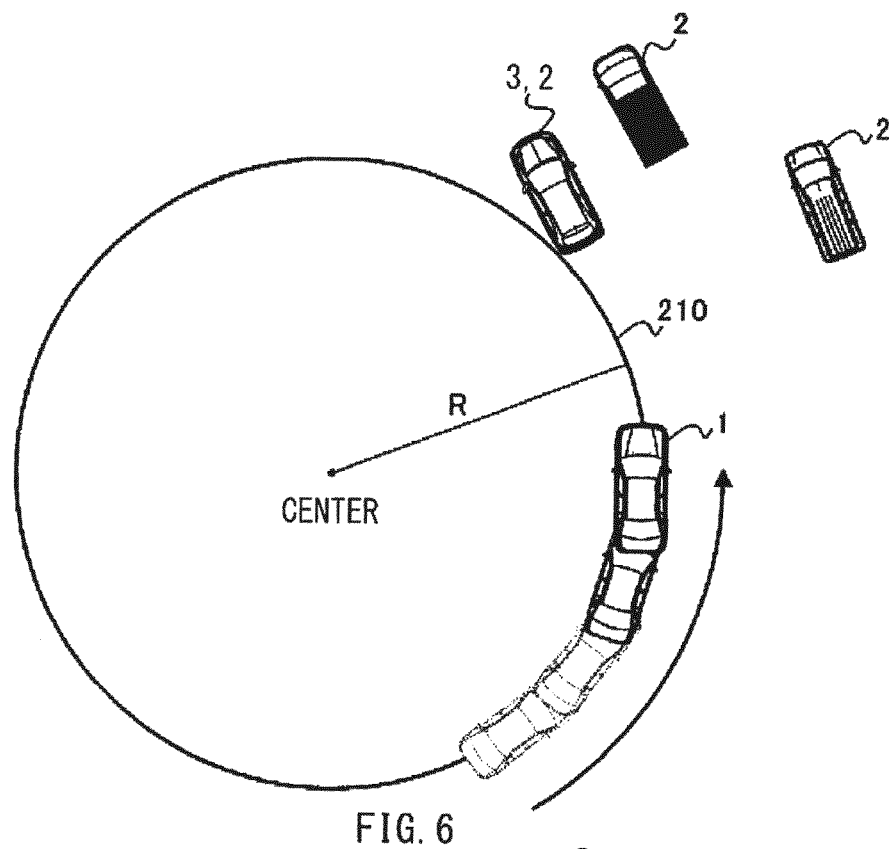
FIG. 6 describes an example of an own-vehicle travel path.

FIG. 6 illustrates an example of the own-vehicle travel path. The own vehicle 1 may move along various travel paths in accordance with roads to be traveled or destinations. First, the travel path derivation unit 164 may estimate an own-vehicle travel path 210 as the travel path of the own vehicle 1 on the basis of the speed of the own vehicle 1 and an angular speed around a vertical axis of the own vehicle 1, and on the basis of the lane lines on the left and right sides of the lane and map information, or road information. The speed of the own vehicle 1 and the angular speed around the vertical axis of the own vehicle 1 may be acquired through an inertial measurement unit mounted on the own vehicle 1. The map information, or the road information, may be acquired through a navigation device using, for example, the GPS (Global Positioning System).

For example, let us assume that the own vehicle 1 is moving along a locus denoted by an arrow in FIG. 6. In this case, an estimated locus obtained by maintaining the locus denoted by the arrow in FIG. 6 provides the own-vehicle travel path 210 denoted by a solid line. Considering that the own vehicle 1 is making a turn, as illustrated in FIG. 6, estimation is made that the own vehicle 1 is moving on the road surface traveled by the own vehicle 1 along a circle represented by a radius R. Thus, the own-vehicle travel path 210 forms a circular arc.

Moreover, there are various candidate vehicles 2 ahead of the own vehicle 1. The candidate vehicles 2 include a vehicle traveling in the same traveling direction as the own vehicle 1, a vehicle cutting in to enter the travel path of the own vehicle 1, a vehicle traveling on an opposite lane, and a vehicle traveling on a road orthogonally crossing the travel path.

In a case with presence of any candidate vehicle 2 on the own-vehicle travel path 210, e.g., in the lane traveled by the own vehicle 1, the travel path derivation unit 164 may set the relevant candidate vehicle 2 as the target vehicle 3, that is, a control target by the follow-up control unit 168 described later.

Figure 7:
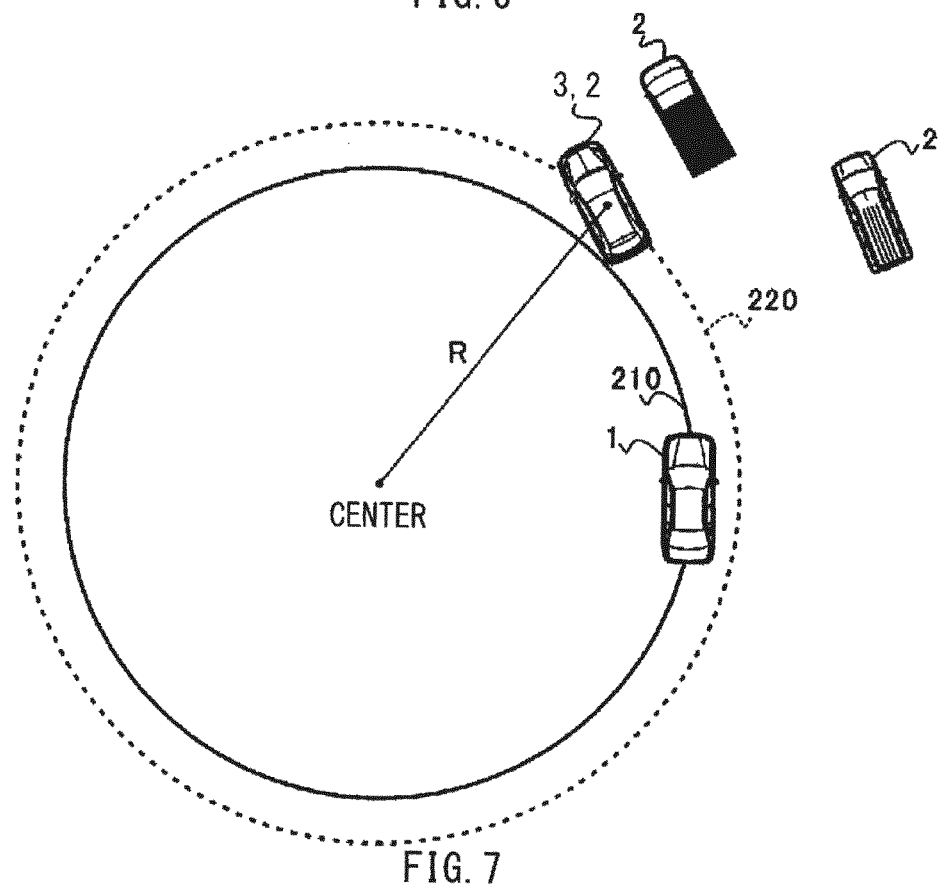
FIG. 7 describes an example of a target-vehicle travel path.

FIG. 7 illustrates an example of the target-vehicle travel path. The travel path derivation unit 164 may derive a target-vehicle travel path 220. The target-vehicle travel path 220 may contain a horizontal center of a back surface of the target vehicle 3 and form the parallel curve to the own-vehicle travel path 210. A parallel curve means a curve located with respect to another curve at a constant distance in a normal direction from any point on the other curve. In one example, as denoted by a broken line in FIG. 7, the travel path derivation unit 164 may set, as the target-vehicle travel path 220, a circle that contains the horizontal center of the back surface of the target vehicle 3 and forms a concentric circle with the own-vehicle travel path 210. A concentric circle means a circle that has the same center as that of another circle. However, as illustrated in FIG. 7, the own-vehicle travel path 210 and the target-vehicle travel path 220 do not always have the same radius R. It is to be noted that the point on the target vehicle 3 the parallel curve contains is not limited to the horizontal center of the back surface of the target vehicle 3 but may be any point on the target vehicle 3. For example, the parallel curve may contain a center in a horizontal in-plane direction of the target vehicle 3.

In a case where the own-vehicle travel path 210 is a straight line or a curve as approximate to a straight line as possible, a size of the circle, or magnitude of the radius, becomes huge. In such a case, approximating the own-vehicle travel path 210 to a circle may cause an increase in a processing load and possibly influence calculation time.

Thus, in a case where the own-vehicle travel path is represented by a circle and the radius of the circle is equal to or greater than a predetermined length, the travel path derivation unit 164 may regard the own-vehicle travel path 210 as a straight line. In this case, the travel path derivation unit 164 may set, as the target-vehicle travel path 220, a straight line that contains a point on the target vehicle 3 and is parallel to the straight line as the own-vehicle travel path 210. Hence, it is possible to reduce the increase in the processing load.

(Speed Derivation Process S206)

Figure 8:
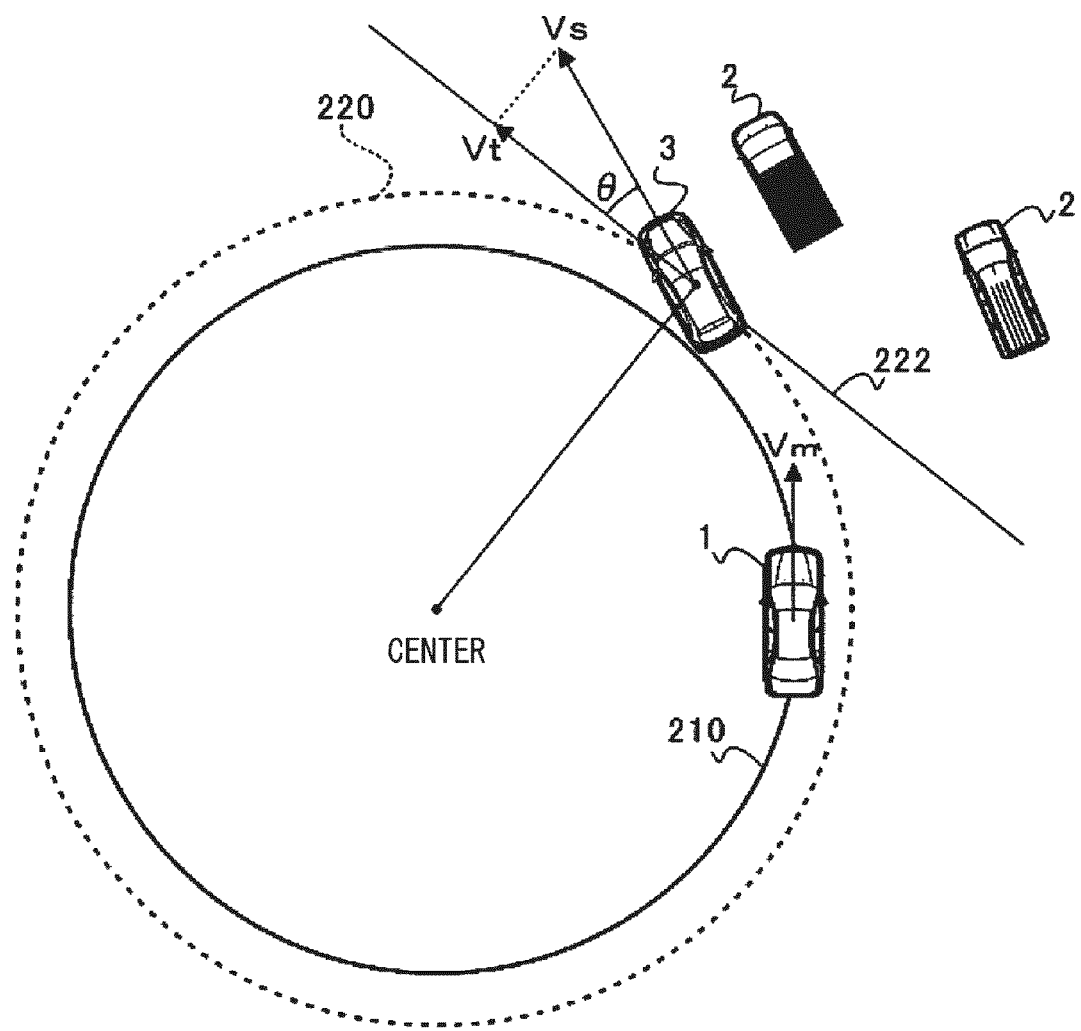
FIG. 8 describes an example of a speed vector of a target vehicle.
Figure 9:
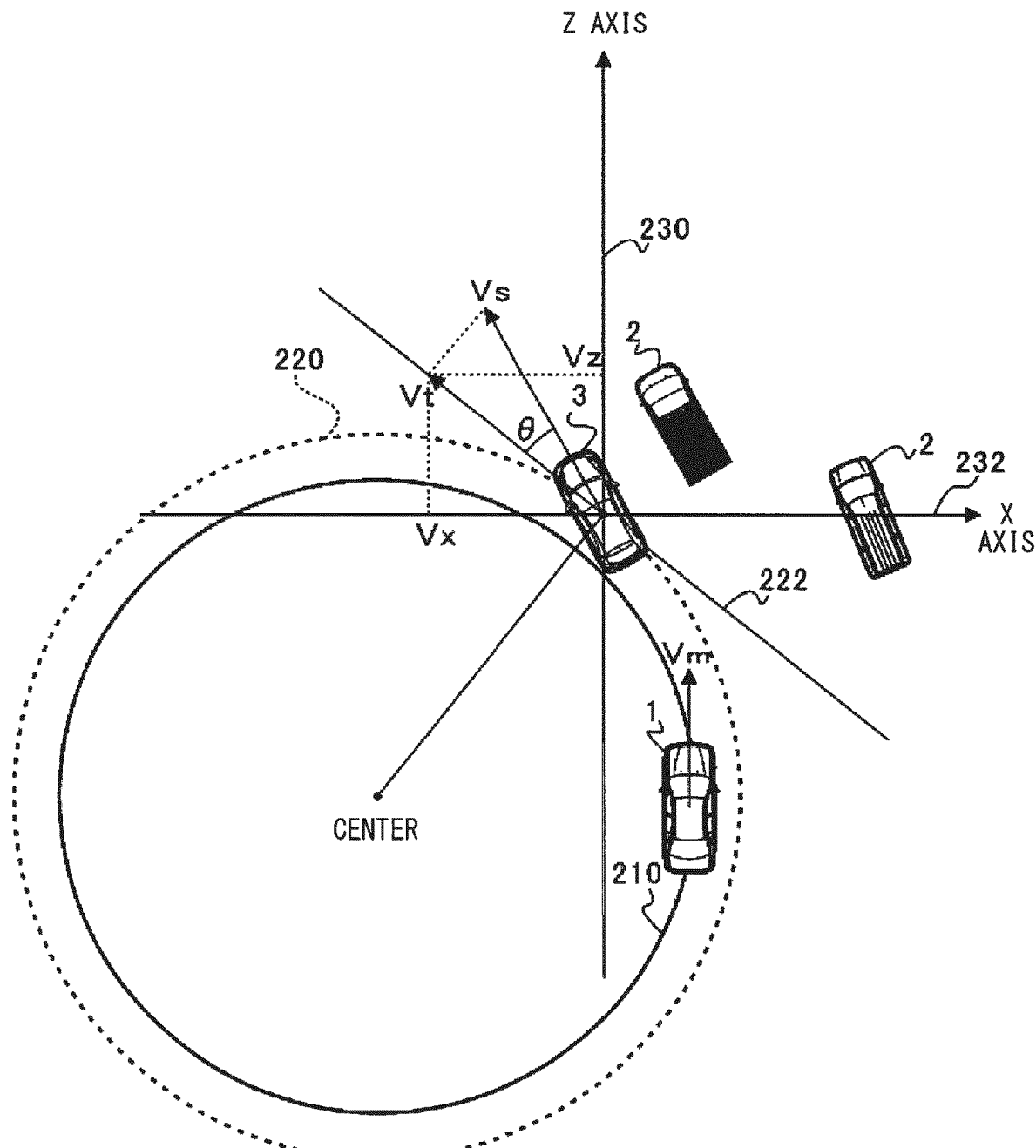
FIG. 9 describes an example of a follow-up control.
Figure 10:
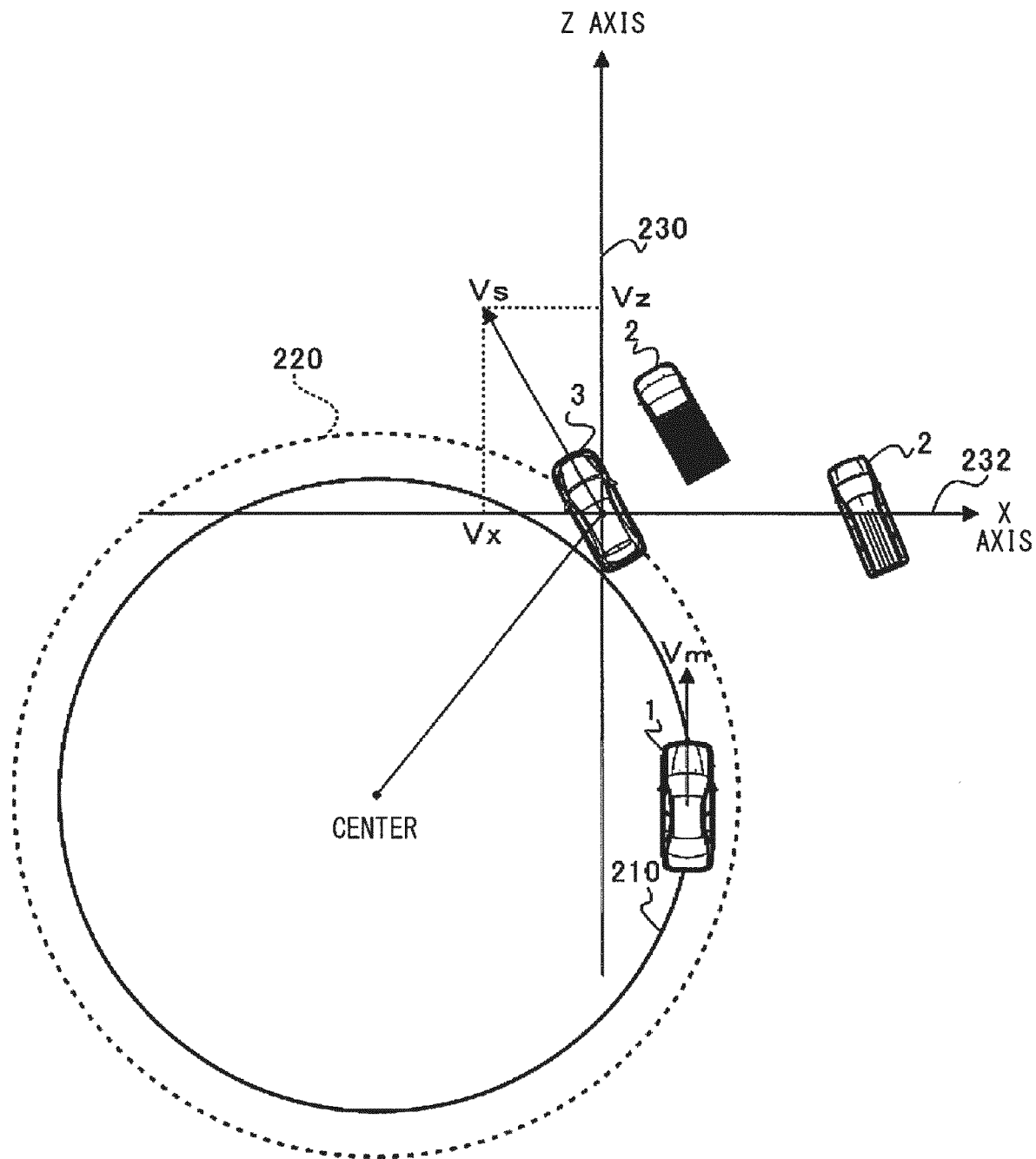
FIG. 10 describes an example of the follow-up control.

FIG. 8 illustrates an example of the speed vector of the target vehicle 3. It is to be noted that vectors illustrated in FIG. 8 and subsequent figures, i.e., FIGS. 9 and 10, are represented by two-dimensional vectors parallel to the road surface. The speed derivation unit 166 may add a relative speed vector of the target vehicle 3 relative to the own vehicle 1, to a ground speed vector Vm of the own vehicle 1, to derive a target-vehicle speed vector Vs. The relative speed vector of the target vehicle 3 relative to the own vehicle 1 may be derived on the basis of transitions of movements of the target vehicle 3 between frames of the distance image 128. The ground speed vector Vm of the own vehicle 1 may be generated on the basis of the speed of the own vehicle 1 by the vehicle exterior environment recognition apparatus 120. The target-vehicle speed vector Vs is a ground speed vector of the target vehicle 3.

Thereafter, the speed derivation unit 166 may set a tangential line 222 as a speed calculation axis, and derive a tangential speed component Vt. The tangential line 222 is a tangential line to the target-vehicle travel path 220 at the point on the target vehicle 3. The target-vehicle travel path 220 is the parallel curve to the own-vehicle travel path 210. The tangential speed component Vt is a tangential speed component of the target-vehicle speed vector Vs along the tangential line 222, and is obtained by decomposing the target-vehicle speed vector Vs. The tangential speed component Vt may be given by Vs·cos θ in which θ denotes an angle formed by the target-vehicle speed vector Vs and the tangential line 222. The speed derivation unit 166 may regard a direction, or a sign, of the tangential speed component Vt as a direction, or a sign, of the target-vehicle speed vector Vs. In this way, it is possible to define a direction, or a sign, of the target-vehicle speed vector Vs although the target-vehicle speed vector Vs does not have a direction, or a sign.

(Follow-Up Control S208)

The follow-up control unit 168 may switch the follow-up control in accordance with the angle θ formed by the target-vehicle speed vector Vs and the tangential line 222.

Back to FIG. 8, the target-vehicle speed vector Vs is angled with respect to the tangential line 222, that is, the tangential line to the target-vehicle travel path 220. In a case where the target vehicle 3 is a vehicle traveling in the same direction as the own vehicle 1, the target-vehicle speed vector Vs of the target vehicle 3 has the same direction as the target-vehicle travel path 220. In this case, the angle θ formed by the target-vehicle speed vector Vs and the tangential line 222 is supposed to become relatively small. Meanwhile, in a case where the target vehicle 3 is a vehicle cutting in to enter the travel path of the own vehicle 1, the angle θ formed by the target-vehicle speed vector Vs and the tangential line 222 is supposed to become relatively great.

Thus, the follow-up control unit 168 makes the follow-up control after the target vehicle 3 on the basis of the target-vehicle speed vector Vs itself in a case where the angle θ formed by the target-vehicle speed vector Vs and the tangential line 222 falls within a predetermined angular range, for example, ±45 degrees. The follow-up control unit 168 makes the follow-up control after the target vehicle 3 on the basis of the tangential speed component Vt in a case where the angle θ formed by the target-vehicle speed vector Vs and the tangential line 222 falls out of the predetermined angular range. The tangential speed component Vt is the speed component of the target-vehicle speed vector Vs along the tangential line 222.

FIGS. 9 and 10 illustrate an example of the follow-up control. As described, in the case where the angle θ formed by the target-vehicle speed vector Vs and the tangential line 222 falls out of the predetermined angular range, the follow-up control unit 168 makes the follow-up control after the target vehicle 3 as the target of the follow-up control, along a direction of the tangential speed component Vt. For example, as illustrated in FIG. 9, the follow-up control unit 168 may decompose the tangential speed component Vt onto a Z axis 230 in the traveling direction of the own vehicle 1 and onto an X axis 232 orthogonal to the traveling direction of the own vehicle 1, to derive a speed component Vz and a speed component Vx. The follow-up control unit 168 may control the speed of the own vehicle 1 in accordance with the speed component Vz to maintain the safe distance between the vehicles.

As described, in the case where the target vehicle 3 is a vehicle cutting in to enter the travel path of the own vehicle 1, the follow-up control unit 168 lowers the speed of the own vehicle 1 on the basis of the tangential speed component Vt. Hence, it is possible to appropriately perform the follow-up control after the target vehicle 3.

Moreover, in the case where the angle θ formed by the target-vehicle speed vector Vs and the tangential line 222 falls within the predetermined angular range, the follow-up control unit 168 makes the follow-up control after the target vehicle 3 along the direction of the target-vehicle speed vector Vs itself. For example, as illustrated in FIG. 10, the follow-up control unit 168 may decompose the target-vehicle speed vector Vs onto the Z axis 230 in the traveling direction of the own vehicle 1 and onto the X axis 232 orthogonal thereto, to derive the speed component Vz and the speed component Vx. The follow-up control unit 168 may control the speed of the own vehicle 1 in accordance with the speed component Vz to maintain the safe distance between the vehicles.

As described, in the case where the target vehicle 3 is a vehicle traveling in the same direction as the own vehicle 1, even when the target vehicle 3 makes a turn, it is possible for the follow-up control unit 168 to perform a smooth travel control on the basis of the target-vehicle speed vector Vs, without rapidly changing the speed of the own vehicle 1.

It is to be noted that the forgoing description is given with an example in which the predetermined angle is 45 degrees, but this is non-limiting. It is sufficient for the predetermined angle to make it possible to determine whether or not to follow the target vehicle 3, i.e., whether or not the target vehicle 3 is a vehicle traveling in the same direction as the own vehicle 1. The predetermined angle may be any angle selected from a range of, for example, 10 degrees to 45 degrees both inclusive.

As described, the predetermined angle is set at an angle that makes it possible to determine whether or not the target vehicle 3 is a vehicle traveling in the same direction as the own vehicle 1. Thus, as long as the target vehicle 3 is traveling on the target-vehicle travel path 220, the angle θ formed by the target-vehicle speed vector Vs and the tangential line 222 with respect to the target vehicle 3 barely becomes greater than the predetermined angle. In other words, no chattering occurs as to whether to make the follow-up control on the basis of the target-vehicle speed vector Vs or whether to make the follow-up control on the basis of the tangential speed component Vt. If the angle θ should become greater than the predetermined angle, the follow-up control unit 168 may put an LPF (low pass filter) on control operation, to suppress rapid changes in behavior of the own vehicle 1.

As described above, the determination is made as to whether or not the target vehicle 3 is a vehicle traveling in the same direction as the own vehicle 1. In accordance therewith, the selection is made as to whether to make the follow-up control on the basis of the target-vehicle speed vector Vs or whether to make the follow-up control on the basis of the tangential speed component Vt. Hence, it is possible to provide the appropriate follow-up control.

There are also provided a program that causes a computer to serve as the vehicle exterior environment recognition apparatus 120, and a recording medium that holds the program. Non-limiting examples of the recording medium may include a flexible disk, a magneto-optical disk, a ROM, a CD (compact disk), a DVD (digital versatile disk), and a BD (blue ray disk). Here, the program means a data processor described in any language or description method.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the forgoing embodiments, both the own-vehicle travel path 210 and the target-vehicle travel path 220 are approximated by the circles represented by the radius R, but this is non-limiting. The own-vehicle travel path 210 or the target-vehicle travel path 220, or both, may be approximated by curves of the second or higher order.

It is to be noted that processes of the vehicle exterior environment recognition processing herein do not have to be processed in the order described in the flowchart, but may include parallel processing or sub-routine processing.

The vehicle exterior environment recognition apparatus 120 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle exterior environment recognition apparatus 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle exterior environment recognition apparatus 120 illustrated in FIG. 1.

The invention claimed is:

1. A vehicle exterior environment recognition apparatus comprising:
    a controller configured to:
        estimate an own-vehicle travel path to be traveled by an own vehicle;
        derive a target-vehicle travel path containing a point on a target vehicle and forming a curve that is parallel to the own-vehicle travel path;
        derive a target-vehicle speed vector as a speed vector of the target vehicle; and
        execute follow-up control based on an angle formed by the target-vehicle speed vector and a tangential line to the target-vehicle travel path at the point on the target vehicle,
    wherein the own-vehicle travel path and the target-vehicle travel path are represented by part of concentric circles.

2. The vehicle exterior environment recognition apparatus according to claim 1,
    wherein the own-vehicle travel path is represented by a circle, and
    wherein the controller linearizes the own-vehicle travel path based on a length of a radius of the circle.

3. A vehicle exterior environment recognition apparatus, comprising
    circuitry configured to:
        estimate an own-vehicle travel path to be traveled by an own vehicle;
        derive a target-vehicle travel path containing a point on a target vehicle and forming a curve that is parallel to the own-vehicle travel path;
        derive a target-vehicle speed vector as a speed vector of the target vehicle;
        execute follow-up control based on an angle formed by the target-vehicle speed vector and a tangential line to the target-vehicle travel path at the point on the target vehicle,
    wherein the own-vehicle travel path and the target-vehicle travel path are represented by part of concentric circles.

4. The vehicle exterior environment recognition apparatus according to claim 1, wherein the controller utilizes the angle formed by the target-vehicle speed vector and the tangential line to the target-vehicle travel path at the point on the target vehicle to determine whether to execute the follow-up control according to the target-vehicle speed vector or a tangential speed component of the target-vehicle speed vector along the tangential line.

* * * * *